US008346940B2

(12) United States Patent
Camille et al.

(10) Patent No.: US 8,346,940 B2
(45) Date of Patent: Jan. 1, 2013

(54) METHOD AND SYSTEM FOR PROVISIONING CUSTOMER PREMISES EQUIPMENT

(75) Inventors: Jean-Paul Camille, Montreal (CA);
Noel Tai-Tung Tin, Toronto (CA);
Frank Siu Hong Chan, Scarborough (CA)

(73) Assignee: BCE Inc., Verdun, Quebec (CA)

( * ) Notice: Subject to any disclaimer, the term of this patent is extended or adjusted under 35 U.S.C. 154(b) by 318 days.

(21) Appl. No.: 12/204,605

(22) Filed: Sep. 4, 2008

(65) Prior Publication Data

US 2009/0063689 A1  Mar. 5, 2009

(51) Int. Cl.
G06F 15/16 (2006.01)
(52) U.S. Cl. .................................................. 709/227
(58) Field of Classification Search .............. 709/227, 709/228, 229
See application file for complete search history.

(56) References Cited

U.S. PATENT DOCUMENTS

| 6,553,029 | B1 * | 4/2003 | Alexander ..................... 370/389 |
| 2004/0034797 | A1 * | 2/2004 | Becker Hof ................... 713/201 |
| 2004/0258028 | A1 | 12/2004 | Hossain et al. |
| 2005/0021703 | A1 * | 1/2005 | Cherry et al. ................. 709/223 |
| 2005/0190892 | A1 | 9/2005 | Dawson et al. |
| 2006/0028980 | A1 | 2/2006 | Wright |
| 2007/0076607 | A1 * | 4/2007 | Voit et al. ...................... 370/230 |
| 2007/0186113 | A1 | 8/2007 | Cuberson et al. |
| 2007/0214270 | A1 | 9/2007 | Absillis |

FOREIGN PATENT DOCUMENTS

| EP | 1708468 A1 | 10/2006 |
| WO | 2008070952 A1 | 6/2008 |

OTHER PUBLICATIONS

International Search Report mailed on May 30, 2008 in connection with corresponding International Patent Application No. PCT/CA2007/001556.
Written Opinion of the International Searching Authority mailed on May 30, 2008 in connection with corresponding International Patent Application No. PCT/CA2007/001556.
RedSky Network Discovery, Real-Time Location Identification for IP Phones, www.redskyE911.com, Copyright 2006 RedSky Technologies Inc., 2 pages.
Nextring, http://www.nextring.com/services/Brand/digium, Nov. 20, 2008, 9 p.
Small Biz Resource, http://www.smallbizresource.com/document.asp?doc id=109173, Nov. 3, 2006, 5 p.

* cited by examiner

*Primary Examiner* — Joseph Avellino
*Assistant Examiner* — Marshall McLeod (57) ABSTRACT

A method for execution by at least one entity in the service provider network. The method comprises receiving an access request from a communication device; determining a logical identifier intended for use by the communication device during an eventual communication session; and identifying, based on the logical identifier, an object linked to a physical location of the communication device. Finally, in one aspect, the method comprises obtaining account credentials for a customer known to be associated with the object, whereas in another aspect, the method comprises establishing a data session between the communication device and a network entity associated with the object without necessarily obtaining any account credentials.

45 Claims, 10 Drawing Sheets

METHOD AND SYSTEM FOR PROVISIONING CUSTOMER PREMISES EQUIPMENT

FIELD OF THE INVENTION

The present invention relates generally to providing access to a public data network such as the Internet and, more particularly, to a method and system for provisioning customer premises equipment to allow access to such a network.

BACKGROUND OF THE INVENTION

Internet access is an example of a service that can be provided by a service provider to its customers. In a typical scenario, the service provider creates an account for a given customer, including account credentials to be used when accessing the Internet. The service provider then ships a modem or other communication device to the customer and provides the customer with the account credentials; the service provider also records a hardware identifier of the modem in association with the customer. Upon receipt and installation of the modem by the customer, the modem is powered on, and the modem contacts service provider equipment at a default location (which may be hard coded in the modem). The service provider equipment recognizes the hardware identifier of the modem as being associated with the service provider. For security purposes, to confirm that the modem is indeed being operated by the customer, the service provider then requires the customer to enter the account credentials before allowing access to the Internet via a gateway, edge router or other form of switch.

One problem that plagues service providers is that customers are frequently inconvenienced by having to enter their account credentials when the modem is initially powered on or after every factory reset. In addition, it also happens that the service provider may send a replacement modem to the customer in response to the customer noticing that the modem that they had previously ordered did not yet arrive. In this case, when shipping the replacement modem, the service provider records the hardware identifier of the replacement modem in association with the customer. However, if the original modem is ultimately received by the customer before the replacement modem, and is installed, then when its hardware identifier is provided to the service provider equipment at the default location, this hardware identifier will not be recognized as being associated with the customer because the hardware identifier currently associated with the customer is the hardware identifier of the replacement modem. In short, the customer could be denied access to the Internet because the original modem was used instead of the replacement modem, which can lead to further frustration on the part of the customer, in fact adding to the frustration that may have led to a request for the replacement modem in the first place.

Thus, there exists a need in the industry to alleviate the above difficulties when regulating a customer's access to a public data network and maintain an accurate customer-to-modem association.

SUMMARY OF THE INVENTION

A first broad aspect of the present invention seeks to provide a method for execution by at least one entity in a service provider network. The method comprises receiving an access request from a communication device; determining a logical identifier intended for use by the communication device during an eventual communication session; identifying, based on the logical identifier, an object linked to a physical location of the communication device; and obtaining account credentials for a customer known to be associated with said object.

A second broad aspect of the present invention seeks to provide a computer-readable medium comprising computer-readable program code which, when interpreted by at least one computing apparatus in a service provider network, causes the at least one computing apparatus to execute a method. The computer-readable program code comprises first computer-readable program code for causing the computing apparatus to be attentive to receipt of an access request from a communication device; second computer-readable program code for causing the computing apparatus to determine a logical identifier intended for use by the communication device during an eventual communication session; third computer-readable program code for causing the computing apparatus to identify, based on the logical identifier, an object linked to a physical location of the communication device; and fourth computer-readable program code for causing the computing apparatus to obtain account credentials for a customer known to be associated with said object.

A third broad aspect of the present invention seeks to provide at least one network entity in a service provider network, comprising means for receiving an access request from a communication device; means for determining a logical identifier intended for use by the communication device during an eventual communication session; means for identifying, based on the logical identifier, an object linked to a physical location of the communication device; and means for obtaining account credentials for a customer known to be associated with said object.

A fourth broad aspect of the present invention seeks to provide a service provider network, which comprises a first entity and a second entity. The first entity is configured to receive an access request from a communication device; and determine a logical identifier intended for use by the communication device during an eventual communication session. The second entity is configured to identify, based on the logical identifier, an object linked to a physical location of the communication device; and obtain account credentials for a customer known to be associated with said object.

A fifth broad aspect of the present invention seeks to provide a method for execution by customer premises equipment. The method comprises transmitting an access request to a network entity over a communication link; obtaining account credentials over the communication link during a configuration session established with a walled garden entity; transmitting the account credentials to the network entity over the communication link; and establishing a communication session with a gateway, the gateway having been previously associated with the account credentials.

A sixth broad aspect of the present invention seeks to provide a computer-readable medium comprising computer-readable program code which, when interpreted by a computing apparatus, causes the computing apparatus to execute a method. The computer-readable program code comprises first computer-readable program code for causing the computing apparatus to transmit an access request to a network entity over a communication link; second computer-readable program code for causing the computing apparatus to obtain account credentials over the communication link during a configuration session established with a walled garden entity; third computer-readable program code for causing the computing apparatus to transmit the account credentials to the network entity over the communication link; and fourth computer-readable program code for causing the computing apparatus to establish a communication session with a gateway, the gateway having been previously associated with the account credentials.

A seventh broad aspect of the present invention seeks to provide customer premises equipment, comprising a memory and a processing unit. The processing unit is configured to transmit an access request to a network entity over a communication link; obtain account credentials over the communication link during a configuration session established with a walled garden entity; store the account credentials in the memory; transmit the account credentials to the network entity over the communication link; and establish a communication session with a gateway, the gateway having been previously associated with the account credentials.

An eighth broad aspect of the present invention seeks to provide customer premises equipment, comprising means for transmitting an access request to a network entity over a communication link; means for obtaining account credentials over the communication link during a configuration session established with a walled garden entity; means for storing the account credentials in the memory; means for transmitting the account credentials to the network entity over the communication link; and means for establishing a communication session with a gateway, the gateway having been previously associated with the account credentials.

A ninth broad aspect of the present invention seeks to provide a method for execution by at least one entity in a service provider network. The method comprises receiving an access request from a communication device; determining a logical identifier intended for use by the communication device during an eventual communication session; identifying, based on said logical identifier, an object linked to a physical location of the communication device; and establishing a data session between the communication device and a network entity associated with said object.

A tenth broad aspect of the present invention seeks to provide a computer-readable medium comprising computer-readable program code which, when interpreted by at least one computing apparatus in a service provider network, causes the at least one computing apparatus to execute a method. The computer-readable program code comprises first computer-readable program code for causing the computing apparatus to be attentive to receipt of an access request from a communication device; second computer-readable program code for causing the computing apparatus to determine a logical identifier intended for use by the communication device during an eventual communication session; third computer-readable program code for causing the computing apparatus to identify, based on said logical identifier, an object linked to a physical location of the communication device; and fourth computer-readable program code for causing the computing apparatus to establish a data session between the communication device and a network entity associated with said object.

An eleventh broad aspect of the present invention seeks to provide at least one network entity in a service provider network, comprising means for being attentive to receipt of an access request from a communication device; means for determining a logical identifier intended for use by the communication device during an eventual communication session; means for identifying, based on said logical identifier, an object linked to a physical location of the communication device; and means for establishing a data session between the communication device and a network entity associated with said object.

A twelfth broad aspect of the present invention seeks to provide a service provider network comprising a first entity and a second entity. The first entity is configured to receive an access request from a communication device and determine a logical identifier intended for use by the communication device during an eventual communication session. The second entity is configured to identify, based on the logical identifier, an object linked to a physical location of the communication device and establish a data session between the communication device and a network entity associated with said object.

These and other aspects and features of the present invention will now become apparent to those of ordinary skill in the art upon review of the following description of specific embodiments of the invention in conjunction with the accompanying drawings.

DETAILED DESCRIPTION OF NON-LIMITING EMBODIMENTS

Figure 1:
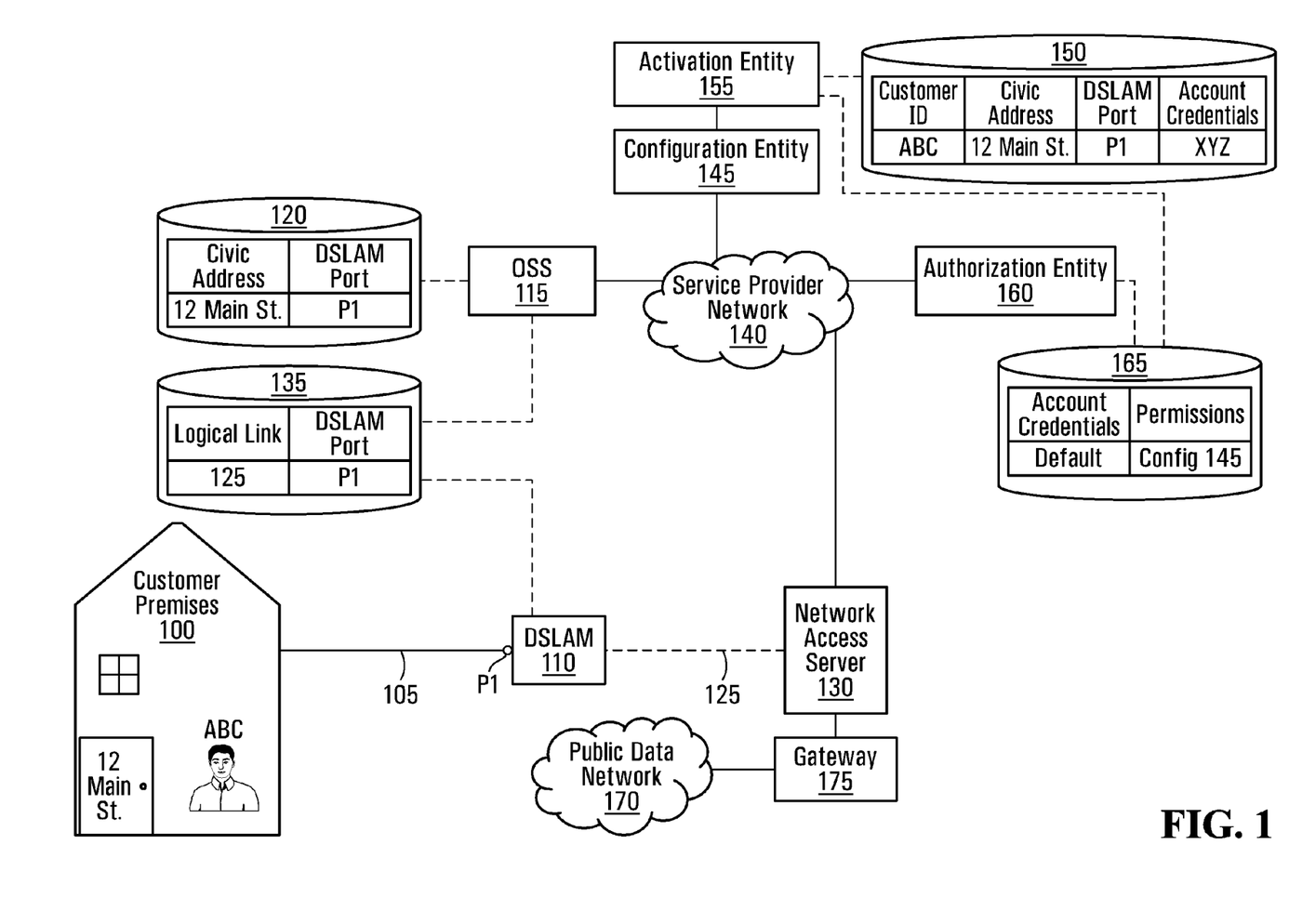
FIG. 1 shows an architecture for delivery of communication services to a customer associated with a customer premises, in accordance with a non-limiting embodiment of the present invention.

With reference to FIG. 1, there is shown an architecture for delivery of communication services to be enjoyed by a customer ABC associated with a customer premises 100. The customer premises 100 is located at a "service point location" (such as a civic address, a set of geo-coordinates, etc.), which is in this case the civic address "12 Main Street". Customer ABC is a customer of a service provider, which operates a service provider network 140 and also provides access to a public data network 170 such as the Internet. Furthermore, the service provider operates a network access server 130 that allows a connection to be established between customer premises equipment (not shown) at the customer premises 100 and either the service provider network 140 or the public data network 170. In some cases, the public data network 170 may be reachable via the service provider network 140 rather than directly via the network access server 130.

The network access server 130 can be connected to the customer premises 100 in a variety of ways. In the specific non-limiting example illustrated in FIG. 1, the network access server 130 is connected to an access node 110, which leads to the customer premises 100 (as well as to other customer premises—not shown) via a physical link 105, such as a copper twisted pair, cable, fiber, fixed wireless, free-space optical, etc. In a specific non-limiting embodiment, the access node 110 can be implemented as a digital subscriber line access multiplexer (DSLAM) with a plurality of ports, each port connected to a different physical link. In the specific non-limiting example illustrated in FIG. 1, one of the ports of the DSLAM 110, denoted P1, is connected to the physical link 105 that leads to the customer premises 100. A database 120 stores a mapping between ports of the DSLAM 110 and associated service point locations, such as an association between port P1 and the civic address "12 Main Street". The database 120 may be populated and maintained by an operation support system (OSS) 115, which represents a collection of systems that perform management, inventory, engineering, planning, repair and other functions for the service provider.

The DSLAM 110 is connected to the network access server 130 via a set of logical links. More specifically, each of the ports of the DSLAM 110 that leads to a given service point location is associated with a respective one of the logical links. In the specific non-limiting example illustrated in FIG. 1, port P1 is associated with a logical link 125. A database 135 stores a mapping between the ports of the DSLAM 110 and associated logical links, such as a mapping between port P1 and logical link 125. The database 135 may be populated by the DSLAM 110 itself, or by the OSS 115. In specific non-limiting embodiments, the logical links can be permanent virtual circuits (PVCs) or virtual local area networks (VLANs), to name a few non-limiting possibilities.

In other embodiments of the present invention, the DSLAM 110 may not be present. For example, consider the case where in the absence of a DSLAM the aforesaid logical link 125 (such as a VLAN or PVC) extends all the way to the customer premises 100. Even under this scenario, communication established over the logical link 125 is still destined to reach the service point location of the customer premises 100. Thus, it can be said that DSLAM port P1 and/or logical link 125 represent an "object" linked to the physical location of the customer premises 100 (i.e., a location-linked object), and which allows communication to be established with the customer premises equipment 200 at that location. The location-linked object could be physical (as in the case of a DSLAM port) or logical (as in the case of a VLAN or PVC). Still other examples of a location-linked object will now become apparent to those of ordinary skill in the art without departing from the scope of the present invention.

In accordance with an embodiment of the present invention, the service provider also operates a configuration entity 145, which is responsible for assisting in configuration of customer premises equipment that may be used by various customers, including customer ABC. Further details regarding operation of the configuration entity 145 will be given later on. For the time being, it should simply be appreciated that the configuration entity 145 is accessible by the network access server 130 via the service provider network 140.

The service provider further operates an authorization entity 160, which is responsible for processing "access requests" received along the logical links (including logical link 125). An "access request" comprises a message or collection of messages specifying a set of account credentials, which may or may not be valid and, if valid, may be a set of "default" credentials or a set of "customer account" credentials. In order to assist in performing its functions, the authorization entity 160 has access to a database 165 that stores a mapping between sets of account credentials and associated network entities. The network entity associated with a given set of account credentials is the entity responsible for managing a communication session initiated following an access request that specifies the given set of account credentials. Examples of network entities that may be responsible for managing a communication session initiated following an access request that specifies a particular set of account credentials include entities (such as a gateway 175) that are connected to the public data network 170 and allow full or partial access thereto, as well as entities (such as the configuration entity 145) that perform specific functions within a corresponding sub-region of the service provider network 140 (sometimes referred to as a "walled garden").

In the specific non-limiting example illustrated in FIG. 1, the database 165 stores an association between a set of "default" credentials and the configuration entity 145. This means that a communication session initiated following an access request that specifies the set of default credentials is to be managed by the configuration entity 145. It should be appreciated that the contents of the database 165 may be updated in a dynamic fashion as new sets of valid credentials are added, deleted or changed, and/or as changes occur to the network entities with which certain ones of the sets of credentials are associated.

The service provider also operates an activation entity 155, which is responsible for directly or indirectly interacting with customers in order to allow service activation, service deactivation and service changes for individual customers, including customer ABC. To this end, the activation entity 155 may comprise or connect to a customer service computer system or online portal. The activation entity 155 is also connected to the configuration entity 145, either directly (as illustrated) or via the service provider network 140. Furthermore, the activation entity 155 has access to the database 165, either directly (as illustrated) or via the service provider network 140.

In order to assist in performing its functions, the activation entity 155 has access to a database 150 that stores various information for each customer, namely a service point location, a DSLAM port and, ultimately, a set of account credentials. In the specific non-limiting example illustrated in FIG. 1, the database 150 stores the civic address "12 Main Street" for customer ABC. Also, port P1 of the DSLAM 110 is included in the database 120 in association with customer ABC. (It should be appreciated that in order to associate customer ABC with port P1 of the DSLAM 110, one can simply consult the database 120 based on customer ABC's civic address "12 Main Street".)

In the example of FIG. 1, it has been assumed that customer ABC has not yet placed an order for a service that requires the use of customer premises equipment. For this reason, no customer premises equipment is illustrated in FIG. 1 and also there is no information in the database 150 regarding any account credentials for customer ABC.

Figure 2:
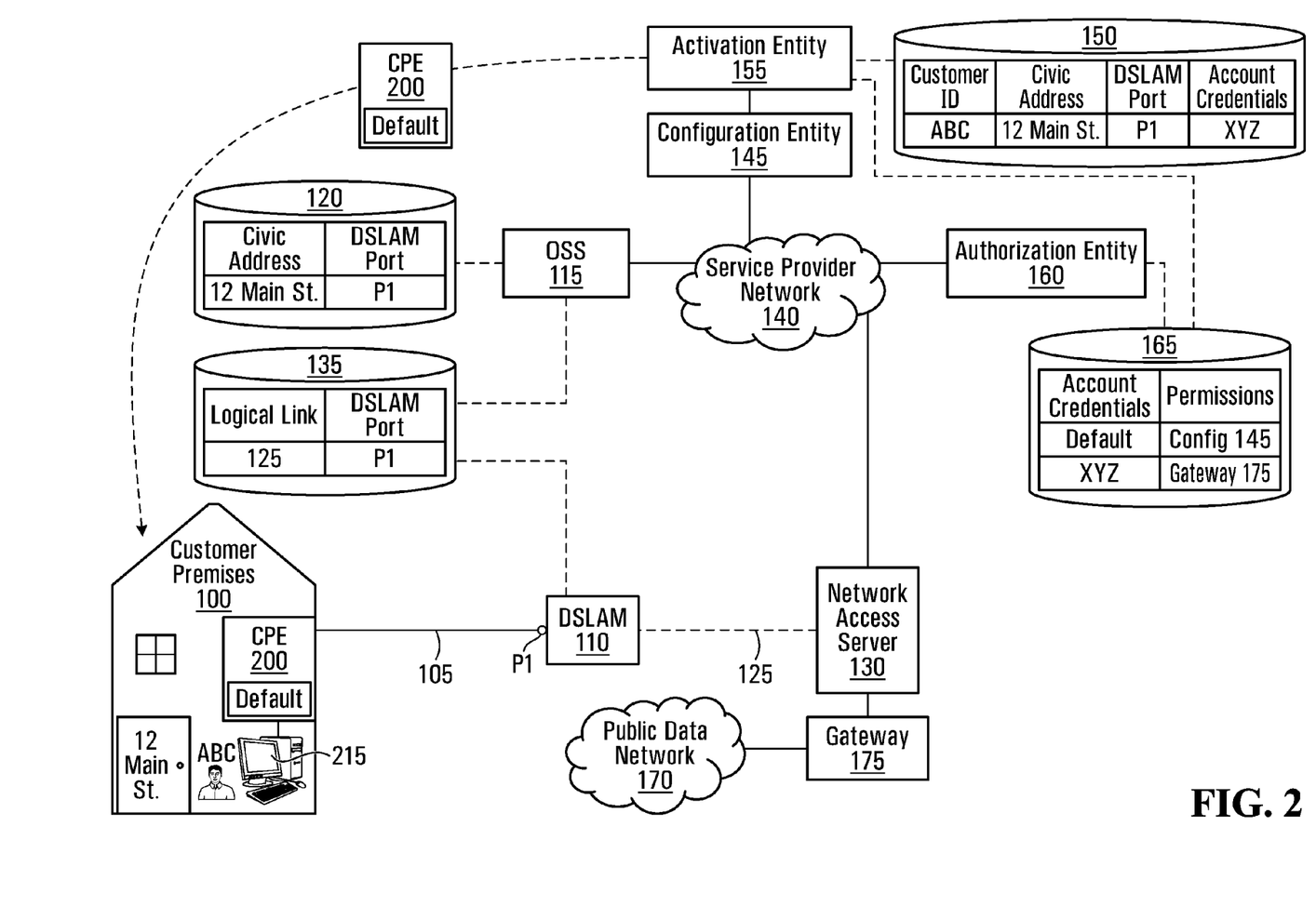
FIG. 2 shows, within the architecture of FIG. 1, shipping of customer premises equipment to the customer for installation at the customer premises.

However, consider now the case where customer ABC places an order for a service requiring customer premises equipment such as a modem or other communication device. This can be done through an order processing function of the activation entity 155. More specifically, customer ABC (residing at the civic address "12 Main Street") contacts the service provider to subscribe to a given service requiring customer premises equipment. With reference now to FIG. 2, the outcome of customer ABC having contacted the service provider may be for the activation entity 155 to assign a set of customer account credentials to customer ABC and thus to associate this set of customer account credentials to customer ABC in the database 150. In the specific non-limiting example of FIG. 2, the set of customer account credentials is denoted "XYZ".

Depending on the service ordered by customer ABC, the set of customer account credentials can be associated with corresponding access permissions. In the present example, the access permissions associated with the set of customer account credentials "XYZ" allow full access to the public data network 170, which is accessed via the gateway 175. Thus, the activation entity 155 updates the database 165 accessed by the authorization entity 160 so that the set of customer account credentials "XYZ" will be associated with the configuration entity 145. This means that a communication session initiated following an access request that specifies the set of customer credentials "XYZ" is to be managed by the gateway 175.

At this stage, the order processing function of the activation entity 155 may cause a modem or other customer premises equipment 200 to be shipped to customer ABC's civic address (i.e., "12 Main Street"). The customer premises equipment 200 may be pre-programmed with the default set of credentials mentioned above and, if necessary, with information allowing the customer premises equipment 200 to locate the network access server 130. Upon receipt at the customer premises 100, the customer premises equipment 200 is installed and powered on. A computing device 215 may be connected to the customer premises equipment 200 in order to allow customer ABC to enjoy the various communication services provided by the service provider.

Although the customer premises equipment 200 is described as having been shipped by the service provider to customer ABC's civic address (in this case, "12 Main Street"), in other non-limiting embodiments, the customer premises equipment 200 may be obtained from another source (or may already be at the customer premises 100 when customer ABC places the order). In such cases, it will be assumed for the present purposes that the customer premises equipment 200 is capable of being programmed with the set of default credentials mentioned above and, if necessary, with information allowing the customer premises equipment 200 to locate the network access server 130.

Figure 3:
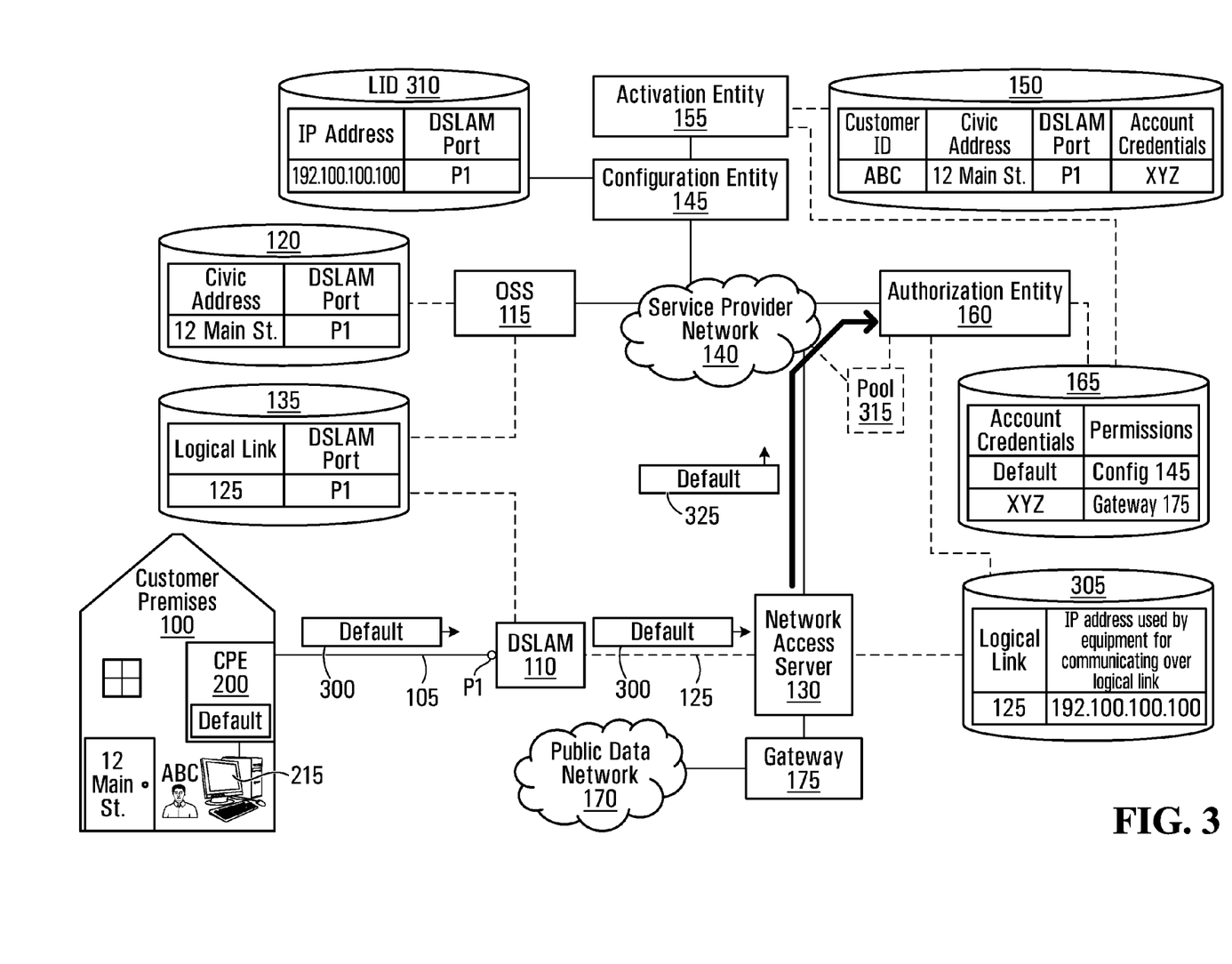
FIG. 3 shows, within the architecture of FIG. 1, issuance of an access request by the customer premises equipment.

Turning now to FIG. 3, the customer premises equipment 200 undergoes a configuration process, which can occur at power-up, with or without triggering by customer ABC. The configuration process includes the customer premises equipment 200 issuing an access request 300 comprising the set of default credentials mentioned above (and which may have been programmed by the service provider prior to shipping). The access request 300 may be formulated as one or more messages. The access request 300 reaches the DSLAM 110 (more specifically, port P1) over the physical link 105, and then reaches the network access server 130 over logical link 125. The network access server 130 is operable to relay the set of default credentials comprised in the access request 300 to the authorization entity 160 in the form of a message 325.

The message 325 may be sent in accordance with a variety of protocols, including but not limited to RADIUS (Remote Authentication Dial In User Service). It should be understood that although the message 325 may have a different format from the access request 300, it may nevertheless still be considered an access request in the generic sense of the expression. The authorization entity 160, which may be implemented in hardware, software, control logic or a combination thereof, implements a process that may comprise execution of background tasks, which can be interrupted under various circumstances. For example, in order to service the message 325 from the network access server 130, the authorization entity 160 may execute the following steps.

Specifically, the authorization entity 160 consults the database 165 based on the set of credentials in the message 325 in order to identify the entity responsible for managing a communication session initiated following the access request 300 (which can be the gateway 175, the configuration entity 145 or another "walled garden" gateway). Communication between the authorization entity 160 and the database 165 may take place using a variety of protocols, including but not limited to LDAP (Lightweight Directory Access Protocol). In the specific non-limiting example illustrated in FIG. 3, the set of credentials in the message 325 corresponds to the set of default credentials and therefore, according to the database 165, the entity responsible for managing a communication session initiated following the access request 300 is the configuration entity 145.

The authorization entity 160 then selects a logical identifier to be used by equipment for communication over logical link 125 (over which the access request 300 was received) during an eventual communication session. Alternatively, the authorization entity 160 may involve another entity in the selection of this logical identifier. The selected logical identifier may be an Internet Protocol (IP) address, for example, such as an Ipv4 or Ipv6 address. Alternatively, the selected logical identifier may be a VLAN tag. In the specific non-limiting example illustrated in FIG. 3, the selected logical identifier is 192.100.100.100. A database 305 is provided that stores a mapping that relates logical links to logical identifiers selected to be used by equipment for communication over those logical links (such as, in this example, the relationship between logical link 125 and logical identifier 192.100.100.100). The database 305 may be accessible to the authorization entity 160 and/or to the network access server 130. It should be appreciated that selection of the logical identifier for use by equipment for communication over logical link 125 can be effected in a variety of ways, including selection from a pool 315 of available logical identifiers. Other implementations are of course possible.

One will appreciate that once a given logical identifier is associated with a given logical link, it becomes possible to go one step further and associate that logical identifier with a DSLAM port, which is uniquely associated with a known service point location. Specifically, when the information stored in the database 305 is combined with the information stored in the database 135, one obtains an association between logical identifiers and ports of the DSLAM 110. This association or mapping can be stored in a location information database (LID) 310. In the specific non-limiting example of FIG. 3, the location information database 310 stores an association between IP address 192.100.100.100 and DSLAM port P1. The location information database 310 is accessible to the configuration entity 145 for future use as will be described herein below. It should be appreciated that the location information database 310 may be created and maintained in a dynamic and transparent fashion, such that it always contains the most up-to-date information regarding the association between logical identifiers and DSLAM ports for specific service point locations.

Figure 4A:
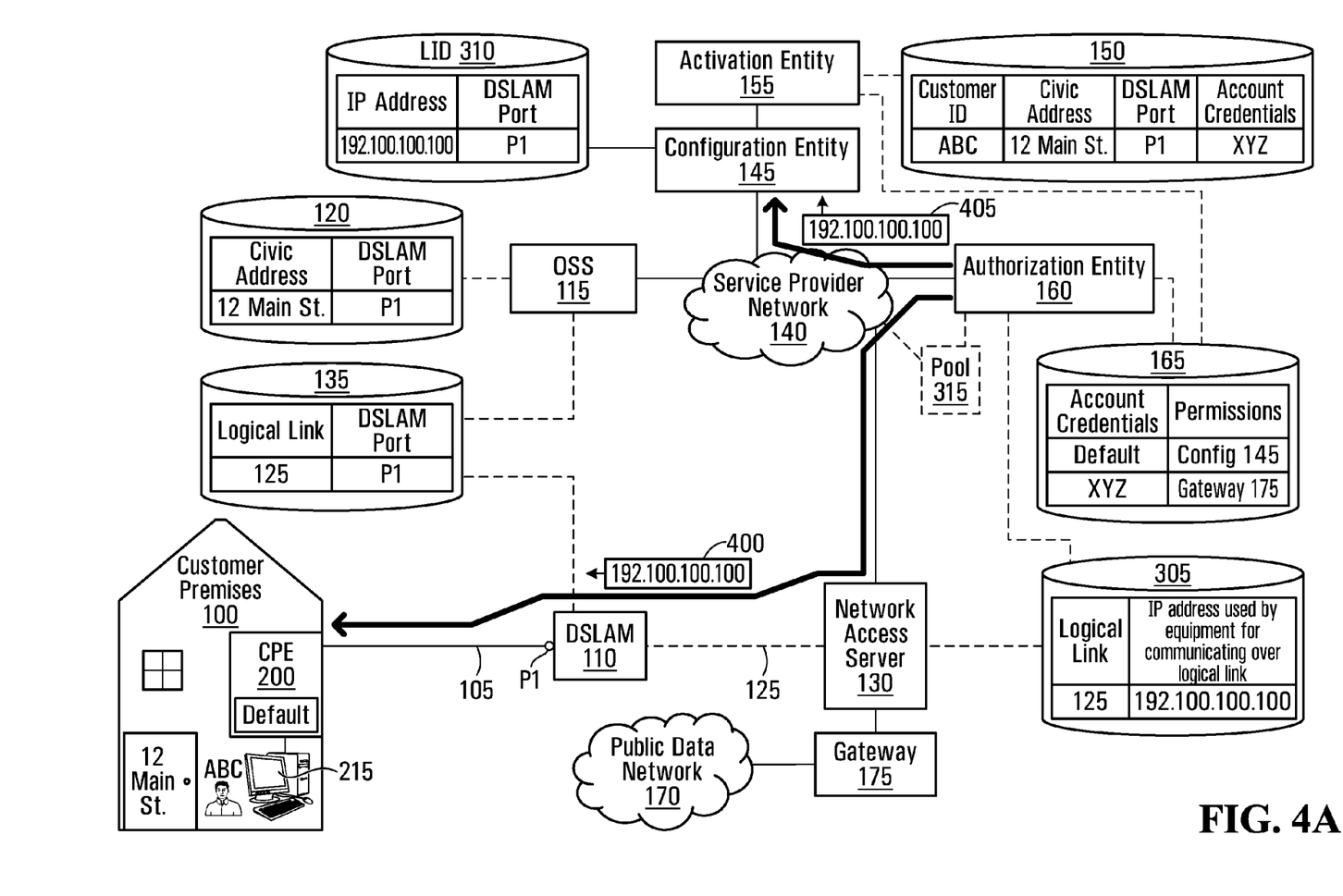
FIGS. 4A and 4B show identification of a logical identifier to be used by the customer premises equipment and two alternative ways of engaging the customer premises in a configuration session with an activation entity in a service provider network.
Figure 4B:
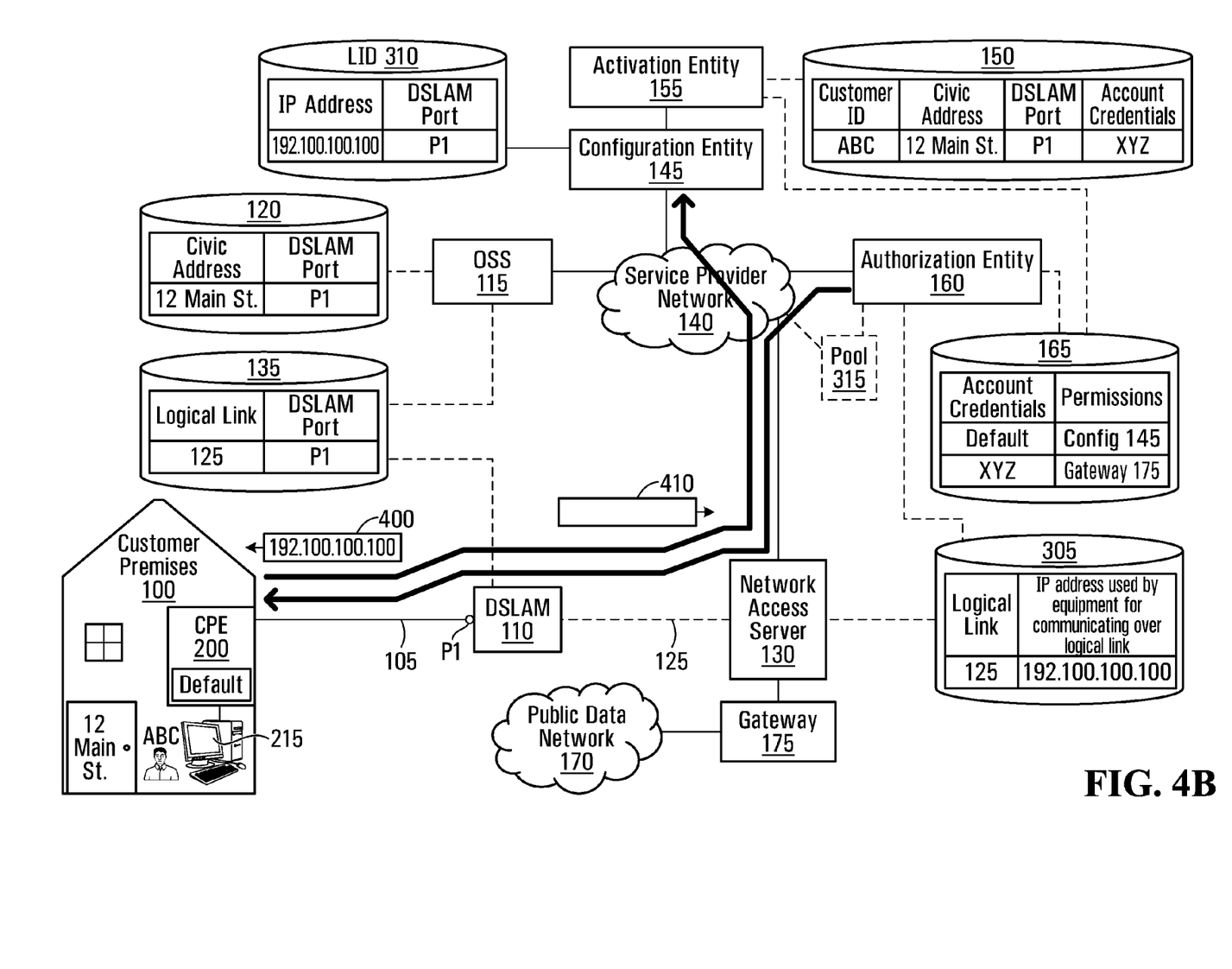

Turning now to FIGS. 4A and 4B, a "configuration session" is established between the customer premises equipment 200 and the entity whose identity was learned by having consulted the database 165 (in this case, the configuration entity 145). To this end, the authorization entity 160 sends a first message 400 to the customer premises equipment 200 to inform the customer premises equipment 200 of the logical identifier selected for use by equipment for communication over logical link 125 (in this case, 192.100.100.100).

In addition, as shown in FIG. 4A, the authorization entity 160 sends a second message 405 to the configuration entity 145 to inform the configuration entity 145 of the logical identifier being used by the customer premises equipment 200 (in this case, 192.100.100.100), and thereby to engage it in communication with the customer premises equipment 200.

Alternatively, as shown in FIG. 4B, the customer premises equipment 200 sends a second message 410 to the configuration entity 145 to engage it in communication with the customer premises equipment 200.

Figure 5:
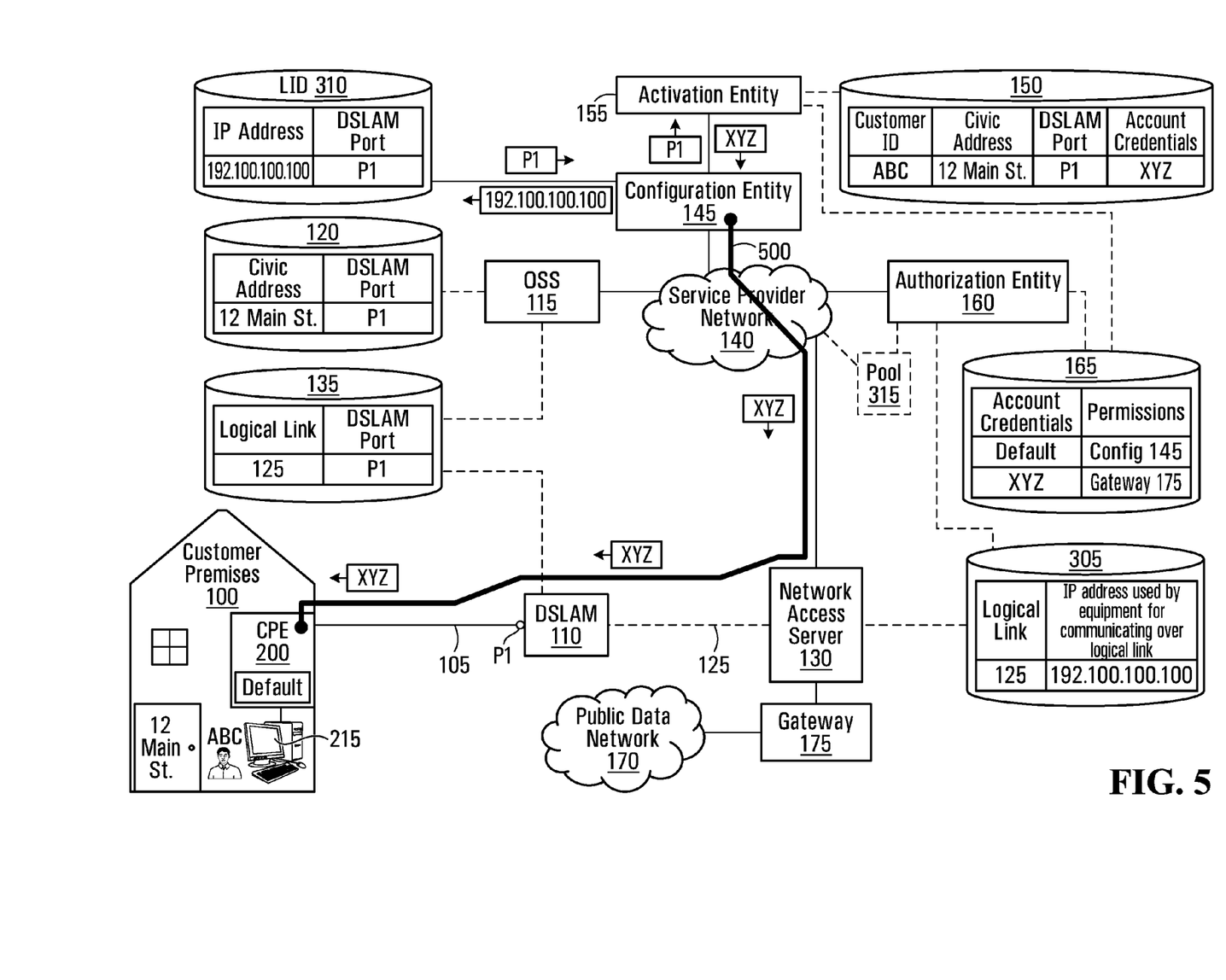
FIG. 5 shows the configuration session established pursuant to either FIG. 4A or FIG. 4B.

In either case, and as shown in FIG. 5, a configuration session 500 is thus established between the customer premises equipment 200 and the configuration entity 145.

The configuration entity 145 then consults the location information database 310 based on the logical identifier being used by the customer premises equipment 200, in order to obtain from the location information database 310 the identity of the associated DSLAM port. In the specific non-limiting example of FIG. 5, the configuration entity 145 consults the location information database 310 based on the logical identifier 192.100.100.100 in order to obtain from the location information database 310 the identity of port P1 of the DSLAM 110. In an alternative embodiment, the configuration entity 145 can perform a two-step process to obtain the same information, namely by accessing the database 305 based on the logical identifier 192.100.100.100 in order to obtain the identity of logical link 125, and then by accessing the database 135 based on the identity of logical link 125 in order to obtain the identity of port P1 of the DSLAM 110.

Next, the configuration entity 145 sends a message to the activation entity 155 that specifies the identity of port P1. Upon receipt of this message, the activation entity 155 consults the database 150 in order to identify the customer associated with port P1 of the DSLAM 110. In the specific non-limiting example of FIG. 1, the activation entity 155 determines that customer ABC is associated with port P1 of the DSLAM 110. Moreover, the activation entity 155 obtains from the database 150 the set of customer account credentials "XYZ" associated with customer ABC. The activation entity 155 formulates a response message specifying the set of customer account credentials "XYZ". Upon receipt of this response message, the configuration entity 145 sends its contents (i.e., the set of customer account credentials "XYZ") to the customer premises equipment 200 as part of the configuration session 500. The configuration process now terminates.

Upon receipt of the set of customer account credentials "XYZ", the customer premises equipment 200 stores it in memory and uses it to make a second access request while the customer premises equipment 200 is still powered on. The result is now described with reference to FIG. 6.

Figure 6:
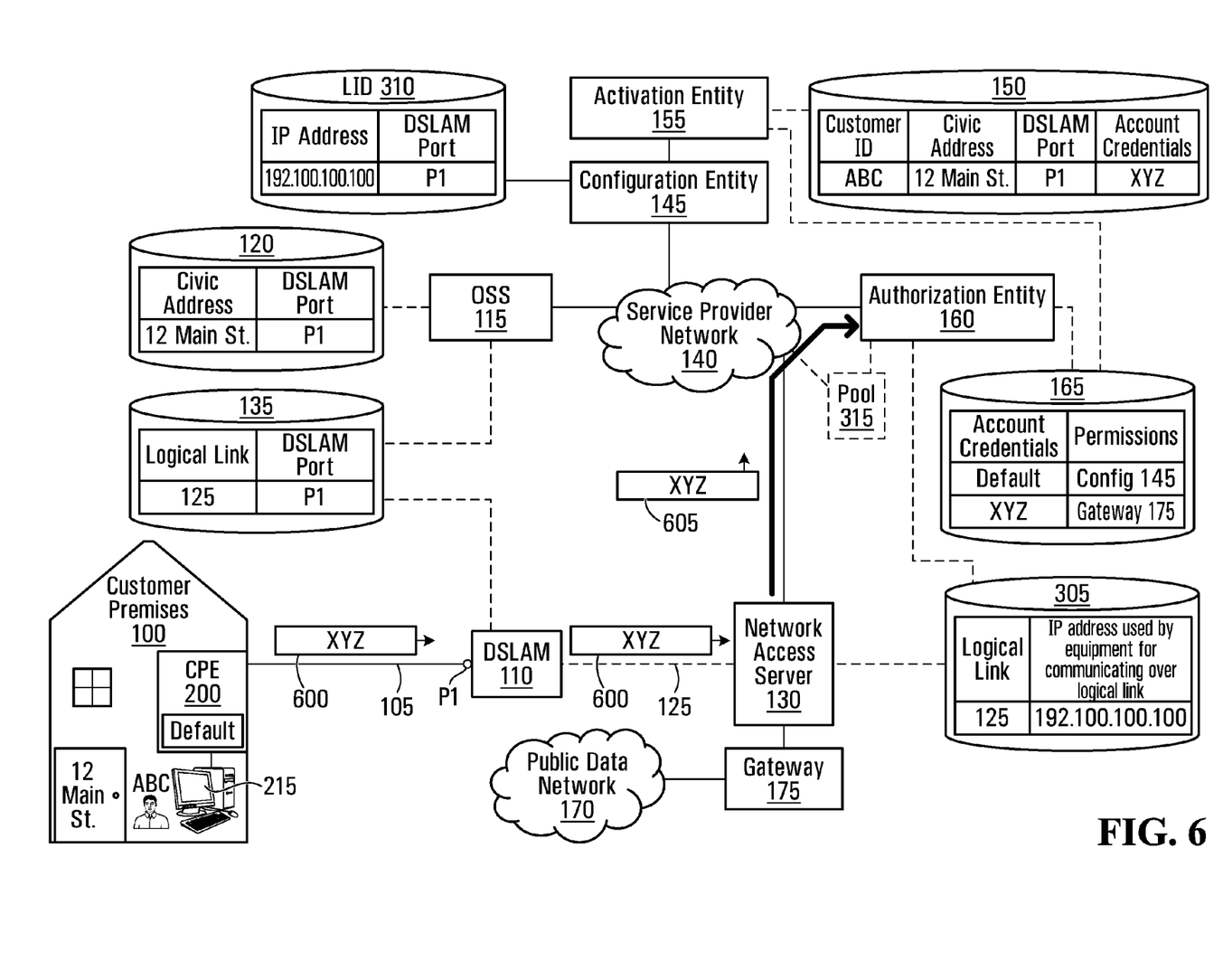
FIG. 6 shows, within the architecture of FIG. 1, issuance of a second access request by the customer premises equipment.

Specifically, the customer premises equipment 200 issues a second access request 600 comprising the set of customer account credentials "XYZ" stored at the customer premises equipment 200 and received during the configuration session 500. In accordance with various non-limiting embodiments, issuance of the second access request 600 can be triggered by the customer ABC (by virtue of accessing Internet using the computing device 215) or by the customer premises equipment 200.

The second access request 600 reaches the DSLAM 110 (more specifically, port P1) over the physical link 105, and then reaches the network access server 130 over logical link 125. The network access server 130 is operable to relay the set of customer account credentials "XYZ" comprised in the second access request 600 to the authorization entity 160 in the form of a message 605.

As with the message 325, the message 605 may be sent in accordance with a variety of protocols, including but not limited to RADIUS. Also, it should be understood that although the message 605 may have a different format from the second access request 600, it may nevertheless still be considered an access request in the generic sense of the expression. Upon receipt of the query message 605, the authorization entity 160 consults the database 165 based on the set of credentials in the message 605 in order to identify the entity responsible for managing a communication session initiated following the second access request 600 (which, it is recalled, can be the gateway 175, the configuration entity 145 or another "walled garden" gateway). In the specific non-limiting example illustrated in FIG. 6, the set of credentials in the message 605 corresponds to the customer account credentials "XYZ" and therefore, according to the database 165, the entity responsible for managing a communication session initiated following the second access request 600 is the gateway 175 to the public data network 170.

Optionally, the authorization entity 160 may then assign (or may involve another entity in the assignment of) a new logical identifier to logical link 125 over which the second access request 600 was received. The new logical identifier is stored in the database 305 in association with logical link 125. Alternatively, the same logical identifier as before (in this case, 192.100.100.100) may be used, in which case the previous step is not necessary. One will appreciate that if a new logical identifier is indeed selected to be used by equipment for communication over logical link 125 (which is itself associated with DSLAM port P1), then the association between such new logical identifier and port P1 can be automatically updated in the location information database 310.

Figure 7A:
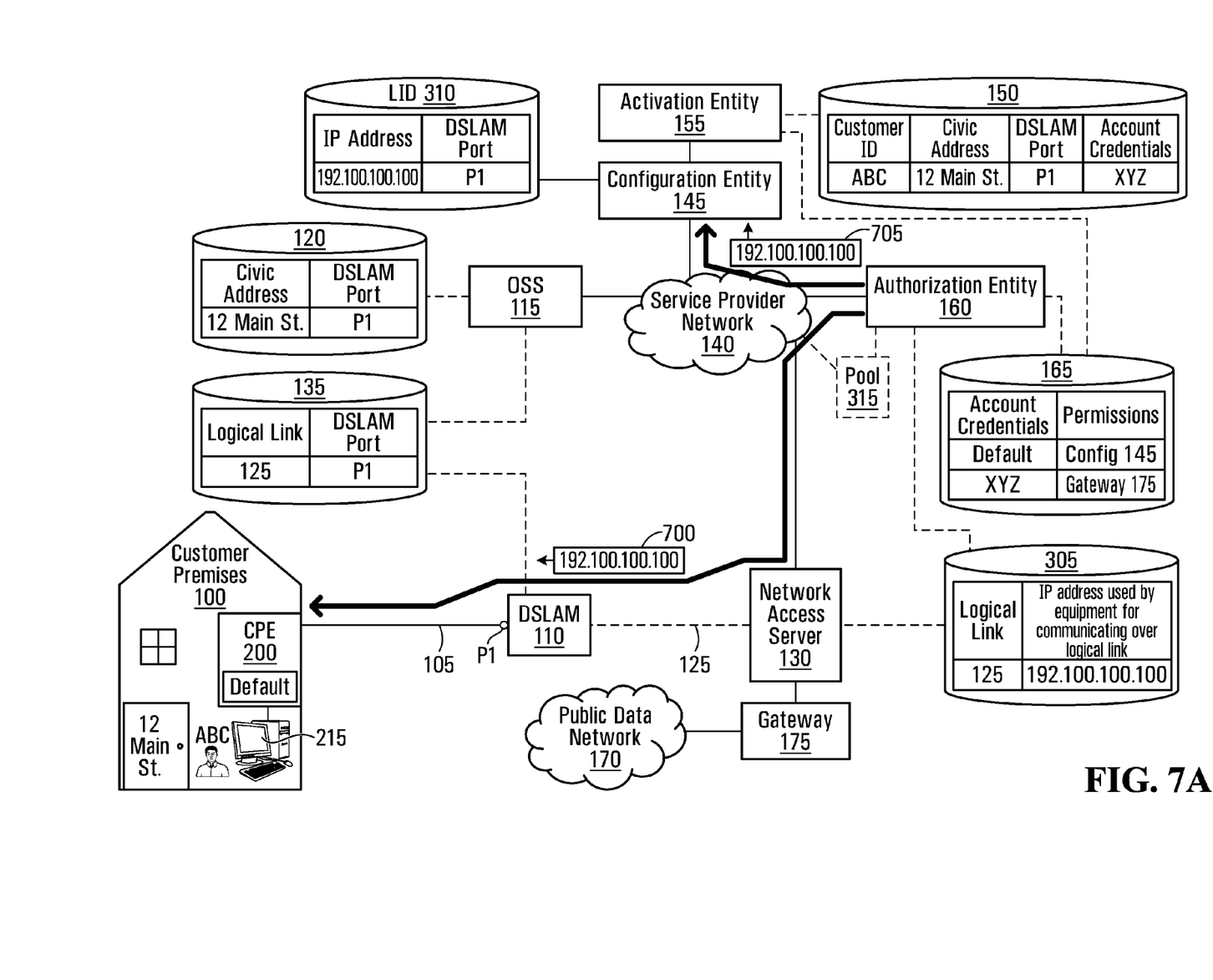
FIGS. 7A and 7B show identification of a logical identifier to be used by the customer premises equipment and two alternative ways of engaging the customer premises in the data session with a gateway to a public data network.
Figure 7B:
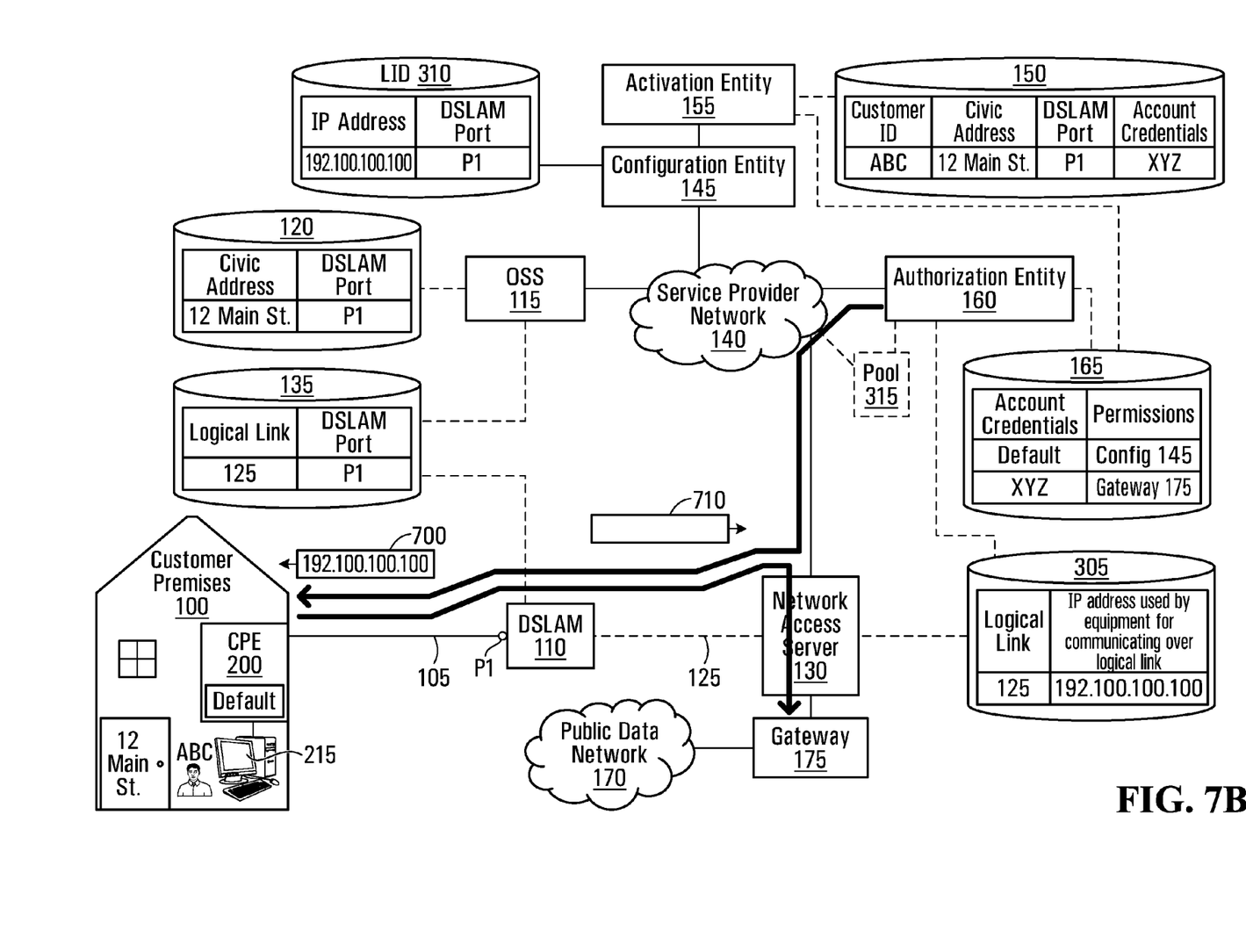

Turning now to FIGS. 7A and 7B, a "data session" is established between the customer premises equipment 200 and the entity whose identity was learned by having consulted the database 165 (in this case, the gateway 175). To this end, the authorization entity 160 can send a first message 700 to the customer premises equipment 200 to inform the customer premises equipment 200 of the logical identifier selected to be used by equipment for communication over logical link 125. Where the selected logical address has not changed, the previous step may not be required.

In addition, as shown in FIG. 7A, the authorization entity 160 sends a second message 705 to the gateway 175 to inform the gateway 175 of the logical identifier being used by the customer premises equipment 200 (in this case, 192.100.100.100), and thereby to engage it in communication with the customer premises equipment 200.

Alternatively, as shown in FIG. 7B, the customer premises equipment 200 sends a second message 710 to the gateway 175 to engage it in communication with the customer premises equipment 200.

Figure 8:
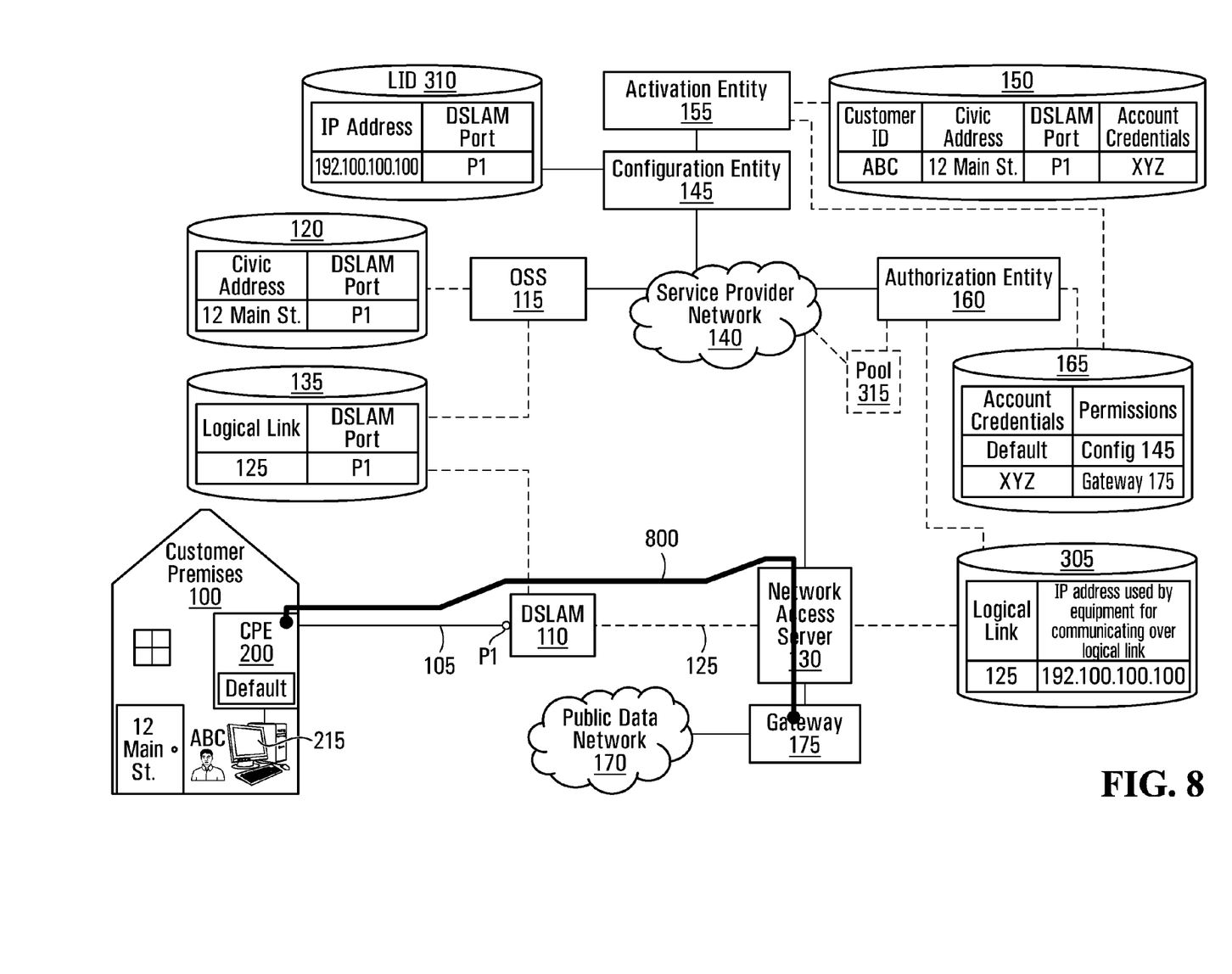
FIG. 8 shows the data session established pursuant to either FIG. 7A or FIG. 7B.

In either case, and as shown in FIG. 8, a data session 800 is thus established between the customer premises equipment 200 and the gateway 175.

It will therefore be appreciated that customer ABC is not asked to enter the set of customer account credentials "XYZ", as these are obtained by the customer premises equipment 200 automatically as part of the configuration session 500, and stored at the customer premises equipment 200 for later use. However, even though this process has been automated, this does not make it less secure. Consider a malicious user who would intercept the customer premises equipment 200. Such a user would still not be able to gain access to the public data network 170 because the set of customer account credentials "XYZ" required to access the public data network 170 are derived from the service provider's own pre-determined knowledge of which service point location is connected to which DSLAM port.

In fact, any modem connected to the physical link 105 leading to port P1 of the DSLAM 110 could be made to function seamlessly from 12 Main Street, provided it were initially programmed with the aforementioned set of default credentials. Recognition of this feature now allows customer ABC to employ third party customer premises equipment (e.g., a modem could be purchased from a source other than the service provider). In accordance with embodiments of the invention, such a modem would obtain the user account credentials for customer ABC merely by being connected to the service point location known by the service provider to be associated with customer ABC.

Moreover, since the configuration process is repeated when a new modem is powered up, there is no longer a danger that service would be refused due to an out-of-date association between the hardware identifier of a device and a given customer. This is because knowledge of the hardware identifier is not required in the embodiments described above. Naturally, it should be understood that associations based on hardware identifiers can still be useful as a supplement to the teachings herein, particularly for purposes other than the configuration process described above.

It should further be appreciated that although the first access request 300 was described as containing the set of default credentials, this is not a requirement of the present invention. Rather, in some embodiments, any type of access request, whether it contain a set of default credentials, a set of invalid credentials or no credentials at all, can be mapped in database 165 to an associated network entity, specifically the authentication entity 145. The result would be the same, namely that the configuration session 500 would be established between the customer premises equipment 200 and the authentication entity 145, and the set of customer account credentials "XYZ" would be transmitted to the customer premises equipment 200 over the configuration session 500 for transmission by the customer premises equipment 200 as part of the second access request 600.

In fact, it should further be appreciated that in some embodiments, the two-step process described above, involving (1) the first access request 300 (which, it has been established above, may or may not contain the set of default credentials) that causes establishment of the configuration session 500 over which are exchanged the set of customer account credentials "XYZ" and (2) the second access request 600 that sends back the set of customer account credentials "XYZ" for establishment of the data session 800, can be reduced to a one-step process with the same end effect of allowing the customer premises equipment 200 to access a desired resource such as the public data network 170. Specifically, the configuration session 500, and the delivery of the customer account credentials "XYZ" over the configuration session 500, can be dispensed with. This leads to the scenario where the knowledge of the DSLAM port associated with customer ABC residing at 12 Main Street serves implicitly as the customer account credentials for customer ABC. Specifically, when an access request is received via a port of the DSLAM 110 (containing any kind of credentials, valid or invalid, or no credentials at all), knowledge of the DSLAM port over which the access request was received allows identification of the customer (by consulting database 120), which would allow determination of the account credentials (by consulting database 150), which then allows determination of the network entity with which the customer premises equipment 200 should communicate (by consulting database 165). Thus, the customer premises equipment which issued the access request is automatically directed to the appropriate network entity with which a data session, rather than a configuration session, is established. It is to be noted that the authentication entity 160 or an entity on behalf thereof can still be involved, as previously described, in the selection of a logical identifier (e.g., IP address) to be used by the equipment for communication over the logical link 125 (over which the access request was received).

Those skilled in the art will appreciate that in some embodiments, groups of two or more of the various network entities (e.g., the configuration entity 145, the authorization entity 160, the activation entity 155, etc.) may be collocated in a single physical component or piece of equipment. By the same token, the functionality of individual ones of the various network entities (e.g., the configuration entity 145, the authorization entity 160, the activation entity 155, etc.) may be distributed over two or more physical components or pieces of equipment.

Those skilled in the art will also appreciate that in some embodiments, some or all of the functionality of the various network entities (e.g., the configuration entity 145, the authorization entity 160, the activation entity 155, etc.) may be implemented using pre-programmed hardware or firmware elements (e.g., application specific integrated circuits (ASICs), electrically erasable programmable read-only memories (EEPROMs), etc.), or other related components. In other embodiments, some or all of the functionality of the various network entities may be achieved using a computing apparatus that has access to a code memory (not shown) which stores computer-readable program code for operation of the computing apparatus, in which case the computer-readable program code could be stored on a medium which is fixed, tangible and readable directly by the various network entities, (e.g., removable diskette, CD-ROM, ROM, fixed disk, USB drive), or the computer-readable program code could be stored remotely but transmittable to the various network entities via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof.

While specific embodiments of the present invention have been described and illustrated, it will be apparent to those skilled in the art that numerous modifications and variations can be made without departing from the scope of the invention as defined in the appended claims.

What is claimed is:

1. A method for execution by at least one entity in a service provider network, the method comprising:
   at an authorization entity:
      receiving an access request from a communication device;
      determining an object linked to a physical location of the communication device;
      selecting a logical identifier for use by the communication device during an eventual communication session;
      storing in a location information database an association between the logical identifier and said object; and
      providing the logical identifier to the communication device and to a configuration entity;
   at the configuration entity:
      obtaining the logical identifier from the authorization entity;
      consulting the location information database, based on the logical identifier, to determine said object; and obtaining account credentials for a customer known to be associated with said object.

2. The method defined in claim 1, wherein the communication device communicates via an access node and wherein said object is a port of the access node to which the communication device is connected by a physical link.

3. The method defined in claim 2, wherein the physical link includes at least one of: a copper twisted pair link, a cable link, a fiber link, a fixed wireless link and a free-space optical link.

4. The method defined in claim 3, wherein said identifying comprises consulting a first database and wherein said obtaining account credentials comprises consulting a second database.

5. The method defined in claim 4, wherein the access node is a DSLAM.

6. The method defined in claim 1, wherein the communication device communicates via a logical link and wherein said object is said logical link.

7. The method defined in claim 6, wherein said identifying comprises (I) accessing a first database that stores a mapping between logical identifiers and associated logical links; and (II) accessing a second database that stores a mapping between logical links and associated objects.

8. The method defined in claim 7, wherein the logical link comprises at least one of a PVC and a VLAN.

9. The method defined in claim 1, wherein said selecting is effected from a pool of available logical identifiers.

10. The method defined in claim 1, wherein the logical identifier comprises at least one of an IP address and a VLAN tag.

11. The method defined in claim 1, further comprising transmitting the account credentials to the communication device.

12. The method defined in claim 1, wherein the account credentials are transmitted to the communication device over the configuration session.

13. The method defined in claim 1, wherein the configuration session is established in response to receiving the access request.

14. The method defined in claim 13, wherein the access request specifies first credentials.

15. The method defined in claim 14, wherein the account credentials are unique to the customer.

16. The method defined in claim 15, wherein the first credentials are default credentials associated with the service provider network.

17. The method defined in claim 16, wherein the default credentials are common to a plurality of devices including the communication device.

18. The method defined in claim 17, wherein the default credentials are pre-programmed into the communication device prior to shipping.

19. The method defined in claim 12, further comprising effecting authorization of the access request and, if successful, redirecting the access request to a walled garden for establishment of the configuration session.

20. The method defined in claim 1, the access request being a first access request, the method further comprising receiving a second access request from the communication device, the second access request comprising the account credentials previously transmitted to the communication device by the configuration entity.

21. The method defined in claim 20, further comprising effecting authorization of the second access request and, if successful, redirecting the second access request to a gateway to a public data network.

22. The method defined in claim 21, further comprising causing establishment of a data session with the communication device.

23. The method defined in claim 22, wherein the communication device uses the logical identifier during the data session.

24. A service provider network comprising:
a first entity configured to:
receive an access request from a communication device;
determine an object linked to a physical location of the communication device;
select a logical identifier for use by the communication device during an eventual communication session
store in a location information database an association between the logical identifier and said object; and
provide the logical identifier to the communication device and to a second entity;
the second entity configured to:
obtain the logical identifier from the communication device during a configuration session;
consult the location information database, based on the logical identifier, to determine said object; and
obtain account credentials for a customer known to be associated with said object.

25. The network defined in claim 24, wherein to determine the logical identifier, the first entity is configured to select the logical identifier from a pool of available logical identifiers.

26. The network defined in claim 24, wherein the access request specifies first credentials and wherein the first entity is further configured to obtain an identity of the second entity based on the first credentials.

27. The network defined in claim 26, wherein the first entity is further configured to cause establishment of the configuration session between the second entity and the communication device.

28. The network defined in claim 27, wherein the first entity is further configured to provide the logical identifier to the second entity further to identification thereof based on the first credentials.

29. The network defined in claim 28, further comprising:
a third entity configured to transmit the account credentials to the communication device.

30. The network defined in claim 29, wherein the third entity is further configured to transmit the account credentials over the configuration session.

31. The network defined in claim 30, wherein the second and third entities are the same.

32. The network defined in claim 30, wherein the first entity is further configured to receive the account credentials from the communication device.

33. The network defined in claim 32, wherein the first entity is further configured to obtain an identity of a fourth entity based on the account credentials.

34. The network defined in claim 33, wherein the account credentials are received in association with a second access request by the communication device.

35. The network defined in claim 34, wherein the first entity is further configured to cause establishment of a communication session between the fourth entity and the communication device.

36. The network defined in claim 35, wherein the fourth entity is a gateway to a public data network.

37. The network defined in claim 35, wherein the first entity is further configured to select a new logical identifier for use by the communication device.

38. The network defined in claim 24, further comprising an access network having a port to which the communication device is connected by a physical link, wherein said object is said port of the access node.

39. The network defined in claim 38, wherein the physical link includes at least one of:
a copper twisted pair link, a cable link, a fiber link, a fixed wireless link and a free-space optical link.

40. The network defined in claim 39, wherein to identify the object, the second entity is configured to consult a first database and wherein to obtain the account credentials, the second entity is configured to consult a second database.

41. The network defined in claim 40, wherein the access node is a DSLAM.

42. The network defined in claim 24, further comprising a logical link over which the communication device communicates, wherein said object is said logical link.

43. The network defined in claim 42, wherein to identify the object, the first entity is configured to (I) access a first database that stores a mapping between logical identifiers and associated logical links; and (II) access a second database that stores a mapping between logical links and associated objects.

44. The network defined in claim 43, wherein the logical link comprises at least one of a PVC and a VLAN.

45. A service provider network comprising:
a first entity configured to:
  receive an access request from a communication device;
  determine a logical identifier intended for use by the communication device during an eventual communication session; and
a second entity configured to:
  identify, based on the logical identifier, an object for allowing communication to be established with the communication device, the object linked to a physical location of the communication device; and
  obtain account credentials for a customer known to be associated with said object;
a third entity configured to transmit the account credentials to the communication device;
wherein the access request specifies first credentials and wherein the first entity is further configured to obtain an identity of the second entity based on the first credentials;
wherein the first entity is further configured to cause establishment of a configuration session between the second entity and the communication device;
wherein the first entity is further configured to provide the logical identifier to the second entity further to identification thereof based on the first credentials;
wherein the third entity is further configured to transmit the account credentials over the configuration session;
wherein the first entity is further configured to receive the account credentials from the communication device;
wherein the first entity is further configured to obtain an identity of a fourth entity based on the account credentials;
wherein the account credentials are received in association with a second access request by the communication device;
wherein the first entity is further configured to cause establishment of a communication session between the fourth entity and the communication device; and
wherein the first entity is further configured to select a new logical identifier for use by the communication device.

* * * * *